United States Patent Office 2,853,388
Patented Sept. 23, 1958

2,853,388

METHOD OF TREATING CEREALS WITH PROTEOLYTIC ENZYMES AND RESULTING PRODUCT

Philip G. Kiely, Belmont, and Robert F. Larsen, Weston, Mass., assignors to Arthur D. Little, Inc., Cambridge, Mass., a corporation of Massachusetts No Drawing. Application December 27, 1955
Serial No. 555,252

7 Claims. (Cl. 99—83)

This invention relates to a method of pretreating cereals, and more particularly to rendering them quick-cooking.

In the manufacture of cereals, for the purpose of marketing them for human consumption, it is customary to crush, grind or roll them to a relatively coarse mesh size and to package them for home preparation which normally consists of boiling in water. Cooking of wheat or corn cereals, for example, may require from 15 to 45 minutes in order to obtain a thoroughly cooked product. Such a cooking period is, however, considered too long for modern living, and it is desirable to market cereals which may be cooked in a much shorter period of time.

Several ways for shortening the cooking time of such cereals for the consumer have been proposed. Thus, one method has been to precook the cereal, sometimes to the extent that only the addition of hot or boiling water is necessary. Another method has been to add a buffer substance capable of raising the pH of the water-cereal mixture during cooking (see for example U. S. Patent 2,131,881). However, precooking is not completely satisfactory because there arises the possibility of ultimately overcooking the cereals and of converting the starch of the grains into a gelatinous mass in the water; while the physical separation of the cereal grains and buffer material may take place if efficient mixing is not achieved. Moreover, these methods do not make it possible to finally cook the cereal in a very short time, i. e., in the order of one minute. It is desirable then to find an improved means for treating cereals which permit them to be cooked in a relatively short period of time, but which does not have the above-mentioned drawbacks.

It is therefore an object of this invention to provide a method of treating or conditioning cereals whereby the time required for effecting a thorough cooking may be materially reduced, without, of course, deleteriously affecting the keeping properties and healthful characteristics as well as flavor of the cereal as a food. A further object is to effect such treatment at the time of manufacture and to have the treated cereal in a condition in which it may be conveniently handled, packaged, shipped, and stored by the ultimate consumer until such time as he may desire to use it. Another object is to provide a cereal which does not contain a separate modifying agent which may be physically separated from the cereal. Yet another object of the invention is to condition the cereal in its manufacture so that it will acquire the properties most suited to rapid cooking, upon the addition of water, and so that the subsequent cooking operation will be facilitated and accelerated. Still a further object is to furnish a cereal for human consumption in which the proteins have been partially predigested, i. e., the peptide chains have been partially hydrolyzed. These and other objects will appear from the following discussion.

In accordance with the invention, the cereal grains may be first crushed, ground or rolled to the desired size, in the customary manner; for example, the grains may be reduced to a mesh size of from about 10 to 35. In this condition each resulting granule will expose a considerable portion of the interior of the original grain substance and the ratio of surface area to the granule mass or volume is relatively high. The starch cells of each granule are more or less associated with, and it is thought, surrounded and protected by the protein content of the granule or supported in a protein matrix. This protein is believed to act as a protective covering which hinders water from reaching the starch cells to break them down. Since cooking is associated with the breaking down of the starch cells, it is necessary to break down the protein molecules or otherwise alter them to permit more rapid penetration of the cooking water into the starch portion of the grain before cooking can be completed. The modification achieved in the protein molecules by this invention is therefore essentially a process of pretreating, not of precooking.

Such pretreating may also take place before the cereal grains are crushed, granulated or otherwise broken up into finer particles or the pretreating step may be accomplished after the cereal is partially broken up but before the final grain shape and size is attained.

By the present invention, ground, granulated, comminuted or otherwise processed granules of cereals (and more particularly corn, oats, rice and wheat) are converted to a condition favorable to rapid cooking by treating with an enzyme, or mixture of enzymes, which is capable of modifying the protein present in the cereal grains so that water may rapidly reach the starch portions of the grains in the final cooking of the cereal. The addition of such enzymes does, in fact, make it possible to cook cereals in a period of from about 30 seconds to one minute.

Although the effects which proteolytic enzymes have on the protein of cereal grains are not completely understood it is possible to establish some of these effects. Thus, it is apparent that those enzymes which attack proteins hydrolyze the peptide bonds of the polypeptide chains of the protein molecules, causing the protein portions in the cereal grain to disintegrate or slake off sufficiently to permit water to penetrate the starch cells. It is further established that the change in protein structure effected by these enzymes is of a chemical nature, although it is likely that physical changes also take place.

Enzymes which attack proteins are referred to as proteolytic enzymes and are to be contrasted with those enzymes which attack starch and are called amylolytic enzymes. The process of this invention is, of course, concerned with the use of the former or proteolytic enzymes. A partial list of proteolytic enzymes suitable for treating cereal grains in accordance with this invention would include, but is not limited to, such enzymes as papain, pepsin, ficin, bromelain, and a fungal enzyme sold as Rhozyme A–4 (Rohm and Haas).

Proteolytic enzymes extracted from both animal and vegetable sources, as well as from both fungal and bacterial sources, and mixtures of proteolytic enzymes, are found to be effective in pretreating cereals in accordance with this invention. However, the enzyme, or enzyme mixture, used must not introduce any objectional flavor or odor or physical characteristic to the finally pretreated cereal, nor must it, of course, be harmful to the human consumer.

The quantity of enzyme required is relatively small, and extended experimental work has indicated that an end point is reached at about 0.1% enzyme by weight of the raw cereal and any further addition of enzyme fails to produce increased effects on the cereal. On the other hand, enzyme present in quantities as low as 0.01% by weight of raw cereal is capable of effecting the beneficial pretreatment of cereals described in this invention.

The process of this invention comprises adding the enzyme to the cereal grains, thoroughly mixing these components under conditions which allow the enzyme to attack the protein structure of the grains, and finally heating for a brief period to a temperature at which all the enzymes present are inactivated and a mild cooking of the cereal is achieved.

In the mixing step, the enzyme and cereal are preferably contacted in the presence of a liquid such as water. Although the enzyme, cereal and water may be added to the mixing equipment in any order, it has been found convenient to add the dry cereal and dry enzymes first in the case of purified wheat middlings. The type of grain, i. e., its shape and natural outside coating, if any, will influence the order in which the components will be most conveniently added.

Although relatively large quantities of water permit somewhat more rapid mixing and more efficient enzyme action it is convenient to keep the amount of water to a minimum, using only enough to wet the surfaces of the cereal grains. This minimum quantity of water is desirable in order to minimize the equipment and time necessary to remove the water when the pretreated cereal is to be dried.

Elevated temperatures are desirable during mixing to speed the enzymatic hydrolysis. However, since the enzyme must remain active during this step, mixing temperatures should not be permitted to rise above about 55° C., while a preferable temperature range is from about 35–50° C. At temperatures much above 55° C., the enzyme is inactivated so rapidly that there is not sufficient time for it to react with the protein to produce the desired result. Moreover, there also arises the possibility of converting the starch to a glutinous mass if excessive temperatures are used for a long period.

Mixing can be conveniently accomplished by any of a number of means known in the art, such as a Hobart water-jacketed mixer, mechanical dough mixer, etc. The size and shape and structure of cereal grains will influence, at least to some extent, the type of mixer used. For example, it would be desirable in the case of oats to use a mixer which would not break up the flat oat grains, a shape which is normally associated with oat cereals. Mixing should be continued until the enzyme has been thoroughly distributed throughout the cereal mass. Mixing times will normally range from about one to two hours, but may be considerably less or more than this.

When the mixing of the enzyme and cereal grains has been completed the mixture is dried to remove the water used in the mixing process. Drying may be done by any convenient means such as by infra-red lamps, circulating air at room temperature or elevated temperature, ovens, etc. The drying process, of course, may be speeded up by spreading the grains on an extended surface, such as in shallow pans or on a conveyor belt, etc. If elevated temperatures are employed it has been found preferable to maintain them at not over about 60° C.

After all of the water used in the mixing process has been removed, it is necessary to heat the now pretreated cereal grains for a brief period to a temperature high enough to inactivate the enzymes. Heating the cereal to about 80–90° C. for a period of about three minutes has been found adequate to accomplish this. The killing or inactivating of the enzymes prevents their further action either during storage or during final consumption.

The process of this invention may be further illustrated by the following examples.

*Example I*

One thousand grams of purified wheat middlings was placed in a Hobart water-jacketed mixer and 0.5 gram of papain, a proteolytic enzyme from the fruit of the pawpaw, and 150 cc. of distilled water was added. The temperature was maintained at about 40° C. and mixing was continued for approximately one hour. At the end of this mixing period the grains were removed to a shallow pan and dried by circulating air at 60° C. until all of the water was removed. The resulting pretreated cereal was then heated to 88° C. for three minutes. A sample was prepared for consumption by bringing 140 cc. of water (containing 0.8 gram of salt) to a boil and then adding 32 grams of the pretreated cereal and cooking for 30 seconds. The taste and texture of the resulting cooked cereal compared favorably with other wheat cereals prepared by other methods.

*Example II*

One thousand grams of purified wheat middlings was pretreated in the same manner as described in Example I using bromelain as the proteolytic enzyme. The sample thus treated was prepared for consumption by bringing 200 cc. of water (containing 0.8 gram of salt) to boil and then adding 32 grams of the pretreated cereal and cooking for 30 seconds. The taste and texture of the resulting cooked cereal compared favorably with other wheat cereals prepared by other methods.

*Example III*

A pill coating machine with wooden spoons clamped inside to give good tumbling action was preheated with infra-red lamps and 200 grams of oats was added and when the temperature reached approximately 37° C., 0.2 gram of papain in 75 ml. of water was sprayed into the pill coater onto the surface of the oats. The heat was removed and mixing continued for five minutes. The oats were then placed in glass covered dishes in an oven at 43° C. for 90 minutes. At the end of this time they were transferred to a B. t. u. oven where they were dried by circulating hot air for 60 minutes at 60° C. and one minute at 88° C. The resulting pretreated oats cereal was prepared for eating by adding one cup of the cereal to two cups of boiling water (containing one-half teaspoon of salt) and cooking for about two minutes with occasional stirring.

Other cereals such as rice, corn meal, corn grits, and granulated wheat and oats may be pretreated in a like manner with a wide variety of proteolytic enzymes to render them quick cooking. Thus, the process of this invention may be applied to any of the generally known cereals in any of their many varied forms. The pretreating with one or more proteolytic enzymes in accordance with this invention may be accomplished before or after the cereal grains have been reduced to their final shape and size.

As seen above, mixing procedures may be widely varied and the time for pretreatment will vary according to the cereal grain used and the enzyme added. The final cooking by the consumer as to ratio of cereal to water and seasoning will also vary widely according to individual tastes. Thus, many variations may be achieved without departing from the scope or spirit of this invention.

The process of this invention provides a pretreated cereal which may be prepared for ultimate consumption by boiling in water for a very brief period. The cereal is so modified by the pretreatment that the proteins are partially digested, making for a more palatable food. Because the modification in the cereal is brought about through chemical changes, rather than by the addition of a separate component such as a material to change the pH of the cooking medium, the cereal of this invention is a completely homogeneous material free from the possibility of component separation in handling and storage.

We claim:

1. Process of preparing cereals to render them quick cooking, comprising the steps of reducing raw cereal grains to granular form, dry mixing with the resulting cereal granules a small amount of proteolytic enzyme in a concentration equivalent to at least 0.01% by weight of said cereal grains, adding only sufficient water to wet the surface of said cereal granules and to distribute said proteolytic enzyme throughout said cereal granules, reacting at temperatures between about 35–55° C. said enzyme with the protein contained in said cereal granules with continuous stirring for from about one to two hours until said protein has been partially digested, and driving off a substantial portion of said water and thermally inactivating said enzyme by a treatment comprising as its terminal portion heating to a temperature between about 80 and 90° C.

2. Process of preparing cereals to render them quick cooking, comprising the steps of reducing raw cereal grains to granular form, dry mixing with the resulting cereal granules at least one proteolytic enzyme in an amount ranging from about 0.01 to about 0.1% by weight of said raw cereal grains, adding only sufficient water to wet the surface of said cereal granules and to distribute said proteolytic enzyme throughout said cereal granules, reacting at temperatures between about 35 and 55° C. said enzyme with the protein contained in said cereal granules with continuous stirring for from about one to two hours until said protein has been partially digested but before any modification of the starch portion of said cereal granules has taken place, driving off a substantial portion of said water and inactivating said enzyme by a treatment comprising as its terminal portion heating to a temperature between about 80 and 90° C. for at least three minutes.

3. Process in accordance with claim 1 wherein said enzyme is present in concentrations of from 0.01% to 0.1% based upon the weight of said cereal granules.

4. Process in accordance with claim 2 wherein said step of reducing said raw cereal grains to granular form comprises reducing the grains to a mesh size of between about 10-35.

5. A quick cooking cereal formed by the steps of dry mixing raw granulated cereal grains with at least one proteolytic enzyme in an amount ranging from about 0.01 to about 0.1% by weight of said raw cereal grains, adding only sufficient water to wet the surface of said cereal grains and to distribute said proteolytic enzyme throughout said cereal grains, reacting at temperatures between about 35 and 55° C. said enzyme with the protein contained in said cereal grains with continuous stirring for from about one to two hours until said protein has been partially digested, and driving off a substantial portion of said water and thermally inactivating said enzyme by treatment comprising as its terminal portion heating to a temperature between about 80 and 90° C.

6. A quick cooking cereal in accordance with claim 5 wherein said cereal grains are purified wheat middlings.

7. A quick cooking cereal in accordance with claim 5 wherein said cereal grains are oats.

References Cited in the file of this patent
UNITED STATES PATENTS

| | | |
|---|---|---|
| 223,038 | Gaunt | Dec. 30, 1879 |
| 693,485 | Ayres | Feb. 18, 1902 |
| 976,332 | Anhaltzer | Nov. 22, 1910 |
| 2,494,544 | Erlich | Jan. 17, 1950 |
| 2,555,235 | Huzenlaub et al. | May 29, 1951 |